July 12, 1932.  H. O. HUTCHENS ET AL  1,866,807
METHOD OF AND APPARATUS FOR MAKING FOUR-PLY STOCK ON THREE-ROLL CALENDERS
Filed June 20, 1929   3 Sheets-Sheet 1
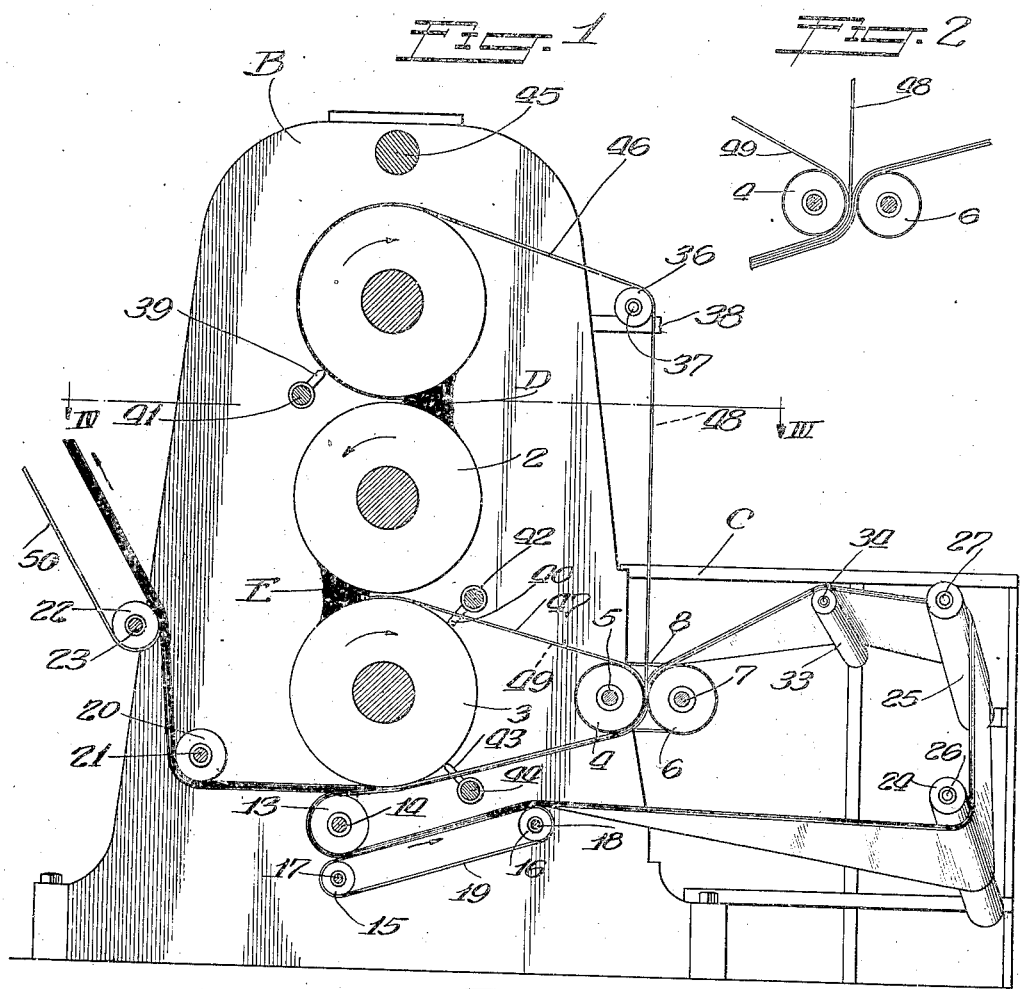
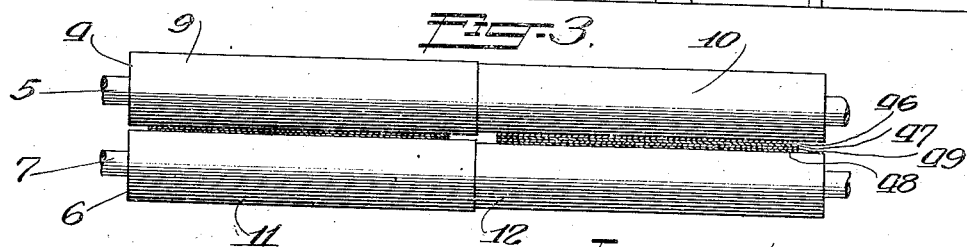
Inventors:
Howard O. Hutchens,
Arnold R. Krause.

July 12, 1932.  H. O. HUTCHENS ET AL  1,866,807
METHOD OF AND APPARATUS FOR MAKING FOUR-PLY STOCK ON THREE-ROLL CALENDERS
Filed June 20, 1929   3 Sheets-Sheet 2

Fig. 4

Inventors:
Howard O. Hutchens.
Arnold R. Krause
by: [signature] Attys.

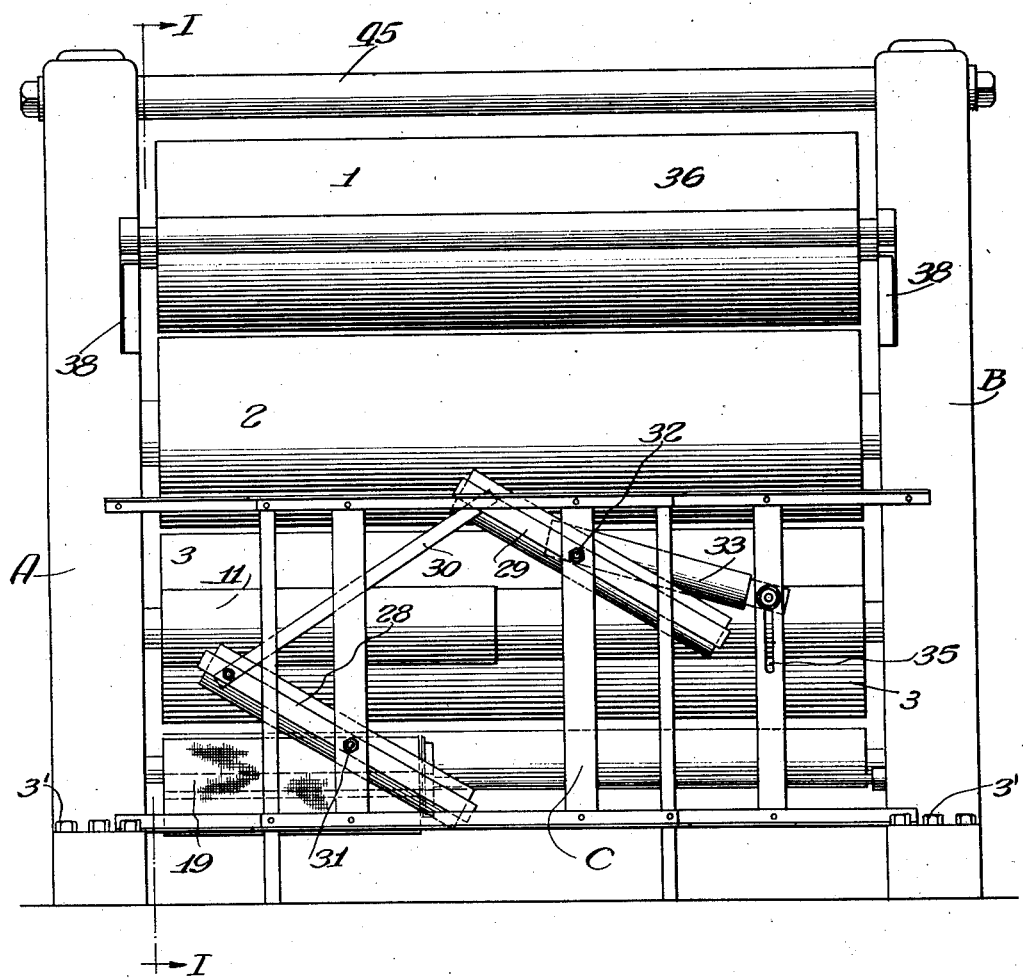

Patented July 12, 1932

1,866,807

UNITED STATES PATENT OFFICE

HOWARD O. HUTCHENS AND ARNOLD R. KRAUSE, OF EAU CLAIRE, WISCONSIN, ASSIGNORS TO GILLETTE RUBBER CO., OF EAU CLAIRE, WISCONSIN, A CORPORATION OF WISCONSIN

METHOD OF AND APPARATUS FOR MAKING FOUR-PLY STOCK ON THREE-ROLL CALENDERS

Application filed June 20, 1929. Serial No. 372,281.

The invention relates to a method of and apparatus for making 4-ply rubber stock on a 3-roll calender, and relates particularly to the method of and apparatus for forming a 4-ply stock from two single-ply widths or strips of rubber stock.

An object of the invention is to provide a simple and novel method of making 4-ply stock on a 3-roll calender.

Another object of the invention is to provide an apparatus which is simple and efficient in use and economical to manufacture for making 4-ply stock on a 3-roll calender.

The above, other and further objects of the invention will be apparent from the following description, accompanying drawings and appended claims.

According to the method of this invention two strips or widths of single-ply rubber stock are formed then slitted, superimposing two single strips and then superimposing a second strip of two-ply stock on the first strip thereby forming a 4-ply stock.

According to the apparatus of this invention, a 3-roll calender is provided to form two single widths of single-ply stock and then bring these together in superimposed relation, slit the sheet and direct one-half of the slitted sheet, now a 2-ply sheet, onto the other half of the 2-ply sheet.

An apparatus is illustrated in the accompanying drawings embodying the invention and also as illustrative of an apparatus arranged to carry out the method of the invention.

The views of the drawings are as follows:

Figure 1 is a partial end and partial sectional view of a machine embodying this invention the section being taken on line I—I of Figure 5.

Figure 2 is a diagrammatic view of the travel of one-half of the slitted sheet formed as single-ply sheets in the calender.

Figure 3 is a top plan view of two rollers of different diameters for forming a two-ply sheet and a four-ply sheet or strip.

Figure 4 is a horizontal sectional view taken on line IV—IV of Figure 1.

Figure 5 is a rear elevational view of the illustrated form of machine.

The illustrated machine includes two roll housings A and B which are illustrated as secured by means of bolts 3' to the floor or foundations.

Three calender rolls 1, 2 and 3 designating the top, middle and bottom rolls, respectively, are journalled in the housings A and B in any suitable manner. These rolls are driven by mechanism not shown but which is of well-known form in the directions indicated by the arrows in Figure 1.

A frame structure indicated generally at C extends outwardly from the front of the machine, that is, to the right as viewed in Figures 1 and 4. The frame is composed of suitable structural elements such as angle bars and the like.

A roll or roller 4 is supported in front of the bottom roll 3 on a shaft 5 which is suitably journalled in the calender housings and which is driven by suitable mechanism not shown.

Another roller 6 is supported on a shaft 7 in front of the roller 4 which shaft 7 is supported in brackets 8 suitably secured to the calender housings.

Figure 3 shows a plan view of rollers 4 and 6. Each roller 4 and 6 has two diameters. The roll 4 has a section of a larger diameter 9 and a section of smaller diameter 10, while roll 6 has a section 11 of larger diameter and a section 12 of smaller diameter. The rollers 4 and 6 are made with the diameters of the sections 9 and 11 approximately the same and the diameters of the sections 10 and 12 approximately the same. Provision of the two sections on each roller provides different sized spaces between these rollers when the same are in position in the machine.

The roller 6 is driven by any suitable mechanism not illustrated.

A roller 13 is supported on a shaft 14 journalled in the calender housings a slight distance below the bottom roll 3 and rearwardly of the center of the same. This roller 13 may or may not be driven by suitable mechanism.

Two rollers 15 and 16 supported on shafts 17 and 18, respectively, are arranged near the bottom of the housings A and B and an endless conveyor 19 or belt passes over these rollers. The roller 15 is arranged adjacent to roller 13 so as to cooperate therewith in a manner to be hereinafter described.

A roller 20 carried on shaft 21 is arranged behind the bottom roll 3 and another 22 on shaft 23 is arranged behind the bottom roll 3, the shaft thereof being journalled in suitable bearings on the housings. The rollers 20 and 22 receive the formed 4-ply strip of stock as the same is formed in the machine and against which rollers said finished strip is removed from the calender.

Rollers 24 and 25 carried on shafts 26 and 27, respectively, are arranged in the frame C, the shaft of each roller being supported in a suitable bracket such as angle brackets 28 and 29 shown in Figure 5. A link 30 connects the brackets 28 and 29 so that the adjustment of the rollers 24 and 25 will be such that the axial relationship of the same will be maintained. The brackets 28 and 29 are secured in a pivotal manner to the frame C by means of bolts 31 and 32 respectively whereby these rollers may be adjusted angularly about the pivotal connections 31 and 32.

A third roller 33 is supported on a shaft 34 which shaft is fastened at one end to a fitting which slides in a slot 35 in a portion of the frame C whereby the angular and vertical positions of the roller 33 may be adjusted.

An idler roller 36 is mounted on shaft 37 which is journalled in bracket 38 projecting from the front of the housings A and B and is arranged near the upper roll 1.

Slitting or cutting knives 39 and 40 are adjustably positioned along rods 41 and 42 respectively with the former knife arranged to slit a sheet formed on the top roll 1 and the slitter 40 arranged to slit a sheet formed on the bottom roll 3 in a manner to be more fully described.

A trimming knife or cutter 43 is supported on a rod 44 for trimming an edge of the 4-ply strip formed in the machine.

The cutters 39, 40 and 43 are adjustable along the supporting rods to slit strips of different widths as desired.

The housings A and B are connected by tie rods 45 and the like to provide a rigid, strong structure.

The calender is arranged to support a mass of rubber material in the position D at the front of the machine between the top and the middle rollers 1 and 2 and in the position E at the rear of the machine between the middle and bottom rollers 2 and 3 respectively for the formation of sheet rubber from this stock. The rubber stock is supported in any well known manner hence the manner of supporting the supply of stock at these points is not illustrated.

The rollers 4 and 6 are arranged in the machine as illustrated in Figure 4, that is, with the smaller diameters 10 and 12 at the back as viewed in Figures 1 and 4 and at the right as viewed in Figure 5.

The method of making 4-ply stock from a three roll calender is as follows:

A strip of single-ply material is formed on the top roll 1 between it and the middle roll 2 which strip is slit by the slitter 39 into two halves with the outer margins of the strip trimmed in the usual manner.

A single-ply strip is formed on the bottom roll 3 between it and the middle roll 2 which strip is also slit into two halves by the slitter 40 with the outer margins trimmed. The front halves, that is, the halves nearer the observer in looking at Figure 1 are led from the rolls 1 and 3 as follows. The front half strip 46 from the top roll 1 is lead over the idler roller 36 while the front half of the strip 47 from the bottom roll 3 is lead over the roller 4 with the front half 46 of the strip from the top roll being superimposed on the front half of the strip 47 from the bottom roll thereby forming a two-ply strip between the portions 9 and 11 of greater diameter of the rollers 4 and 6.

The rear half 49 of the strip formed on the bottom roll 3 is lead over the portion 10 of smaller diameter of the roll 4 while the rear half 48 of the strip formed on the top roll 1 is lead over the idler roller 36 and downwardly being superimposed on the rear strip 49 from the bottom roll 3 between the sections 10 and 12 of reduced diameter of the rollers 4 and 6.

The two-ply strip formed between the portions 9 and 11 of the rollers 4 and 6 is lead over the roller 13 downwardly and over endless conveyor 19 and thence around the roller 24 upwardly over the roller 25 thence over the roller 33 which rollers are inclined to direct the two-ply strip into the space between the reduced portions 10 and 12 of the rollers 4 and 6 where this two-ply strip is then formed with the two single-plies 48 and 49 from the top and bottom rollers, respectively, thereby forming a 4-ply strip. The 4-ply strip is then lead rearwardly, that is, from right to left as viewed in Figure 1, underneath the bottom roll 3 where said strip bears against said roll against roller 20, upwardly over roller 22 whence it is removed by means of a suitable conveyor such as the endless conveyor 50 shown in Figure 1 to a place of use or wound into a roll for further use.

The inclination of the rollers 24, 25 and 33 is such as to deflect the two-ply strip away from the portions 9 and 11 of larger diameter of the rollers 4 and 6 and into the portions of smaller diameter 10 and 12 of the same rollers without stretching or otherwise affecting the rubber strip formed in accordance with this invention. The inclination of these rollers is such, as before stated, to accomplish deflection of the two-ply strip without stretch and without imposing undue strain on the same.

The rollers 4 and 6 are relatively adjustable, the adjustment being accomplished in any desired manner. An easy manner to accomplish this adjustment is by means of weights and springs.

Figure 1 shows in the foreground the two-ply strip as formed by the front portions 46 and 47 being lead backwardly or to the front of the machine over the rollers 24, 25 and 33 and into the space between the smaller portions 10 and 12 of the rollers 4 and 5 and at the left of lower roll 3 shows the finished 4-ply strip being removed from the machine.

Figure 2 illustrates the manner of combining two single-ply strips with one two-ply strip to form the finished four-ply strip of the invention.

The invention has been described herein more or less precisely, yet it is to be understood that changes may be made in the arrangement and proportion of parts and that equivalents may be substituted without departing from the spirit and scope of the invention.

The invention is claimed as follows:

1. Method of making 4-ply stock on 3-roll calender which consists in forming two full width sheets of single ply stock, slitting said sheets, bringing together similar halves of said two slit sheets to make two 2-ply strips, and then directing one of the two-ply strips so formed on to the other two-ply strip.

2. Method of making 4-ply stock on 3-roll calender which consists in making two single-ply split strips, bringing the same together in superposed relation to form two sheet parts each having two plies, and directing one half of said two-ply sheet onto the other half of the two-ply sheet and subjecting the same to pressure.

3. Method of making multiple-ply stock which consists in forming a plurality of strips of single-plies, bringing said single plies into superposed relation, slitting the plies in such relation, and directing certain of said slitted strips so formed onto one of the other slitted strips in superposed relation, and subjecting the same to pressure.

4. A three-roll calender arranged to discharge two strips of rubber, means for slitting the strips discharged from said calender, means for superposing similar strips slitted from said rubber strip to form two-ply stock strips, and means for superposing one of the two-ply strips on to another two-ply strip to form 4-ply stock.

5. In combination, a 3-roll calender, said calender arranged to discharge two strips of rubber one above the other, means for slitting the strips discharged from said calender, means for superposing slitted portions of the upper strip on corresponding portions of the lower strip to form two-ply strips, and means for superposing said two-ply strips to form multi-ply strips of stock.

6. A calender comprising three calender rolls, a pair of rollers, each roller having a portion of larger diameter and another portion of smaller diameter, said rollers arranged with the larger diameters opposed to each other and with the smaller diameters opposed to each other, slitters adjacent the top and bottom rolls disposed to halve strips formed on each of said rolls, said rollers arranged to receive similar halves of said strips between the portions thereof of larger diameter, a conveyer under said rollers and arranged to receive said halves of said strips, a plurality of angularly inclined rollers over which said halves of said strips are passed, said last mentioned rollers being inclined to deflect said halves of said strips away from between the portions of larger diameter of said first mentioned rollers and toward the portion of smaller diameter thereof, the other halves of the slitted strips from said calender being directed between the portions of smaller diameter of said first mentioned rollers along with the strips delivered thereto from between the portions of larger diameter by said inclined rollers.

7. The method of making a multi-ply rubber sheet which consists in forming a sheet from rubber stock, slitting the sheet into portions which lie side by side, feeding said portions away from the forming and slitting positions, moving one of said portions diagonally away from the other into superposed relation with respect to the other portion, and then directing said portions into superposed position in intimate relation.

In testimony whereof, we have hereunto subscribed our names at Eau Claire, Eau Claire County, Wisconsin.

HOWARD O. HUTCHENS.
ARNOLD R. KRAUSE.